Jan. 15, 1935.  J. NYGAARD  1,988,249
ARTIFICIAL FISH BAIT
Filed July 24, 1933  2 Sheets-Sheet 1

INVENTOR.
JOHAN NYGAARD
BY
ATTORNEYS.

Jan. 15, 1935.   J. NYGAARD   1,988,249
ARTIFICIAL FISH BAIT
Filed July 24, 1933   2 Sheets-Sheet 2

INVENTOR.
JOHAN NYGAARD
BY
ATTORNEYS.

Patented Jan. 15, 1935

1,988,249

UNITED STATES PATENT OFFICE 1,988,249

ARTIFICIAL FISH BAIT

Johan Nygaard, Brooklyn, N. Y.

Application July 24, 1933, Serial No. 681,836

6 Claims. (Cl. 43—44)

The present invention relates to artificial fish bait and, more particularly, to an improved fish bait especially adapted for use in surface fishing by the seine method.

It is well known that in the seine method or surface fishing, it is necessary to attract the fish to within say 7 to 10 fathoms of the surface of the water to make it possible to lower nets and then to encircle and catch the fish. Heretofore, when the fish were below the fishing depths, white rags or other baits were used in order to lure the school of fish to the surface. Prior baits of the foregoing type had serious disadvantages. The more important disadvantages were lack of brightness due to insufficient light imparted thereto, especially on dark days, unattractiveness of the bait generally, and inability of the bait to simulate active and moving lifelike worms, eels and the like. Although many attempts have been made to overcome the aforesaid disadvantages, none, as far as I am aware, has been completely satisfactory and successful in practical fishing.

It is an object of the present invention to provide an artificial fish bait which will effectively lure a school of fish to the surface of the water and in the vicinity of the bait.

It is another object of the present invention to provide a combination of coils simulating an active mass of worms, eels or the like which will attract a school or large body of fish.

It is a further object of the present invention to provide an artificial fish bait capable of being illuminated in order to enhance the attractiveness of the bait to give the bait an appearance of moving life.

It is also within the contemplation of the invention to provide an artificial fish bait capable of being held in its proper position in the water and of being provided with a connection for electrical energy.

Other objects and advantages of the present invention will become apparent from the following description taken in conjunction with the drawings, in which.

Figure 1:
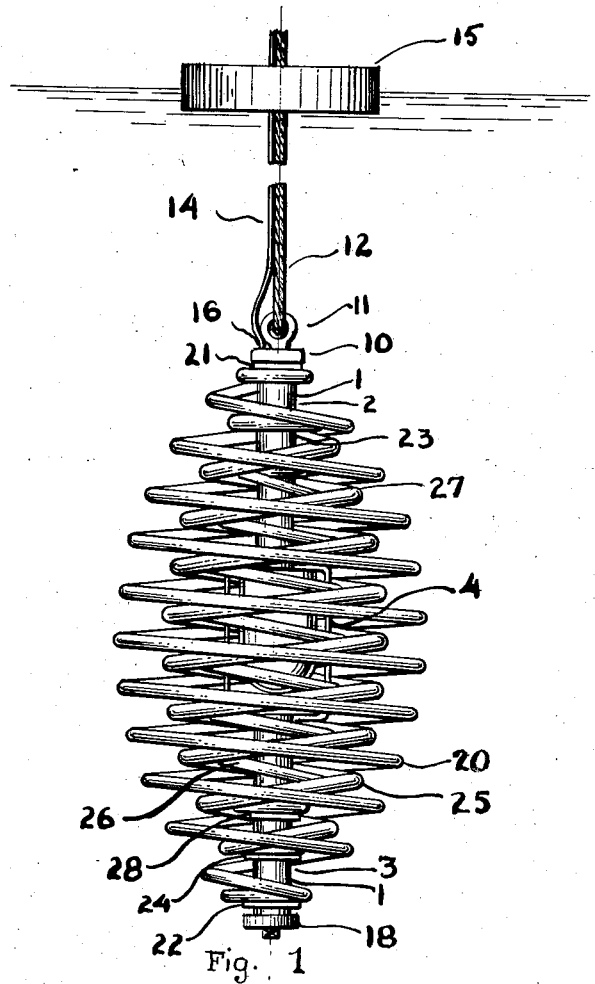
Fig. 1 is an elevational view of an artificial bait embodying the present invention and showing its position in the water.
Figure 2:
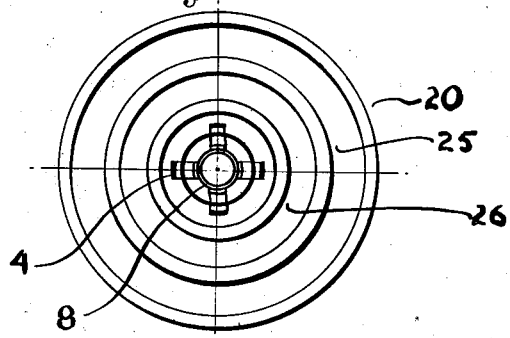
Fig. 2 is a sectional view of the fish bait of Fig. 1.
Figure 3:
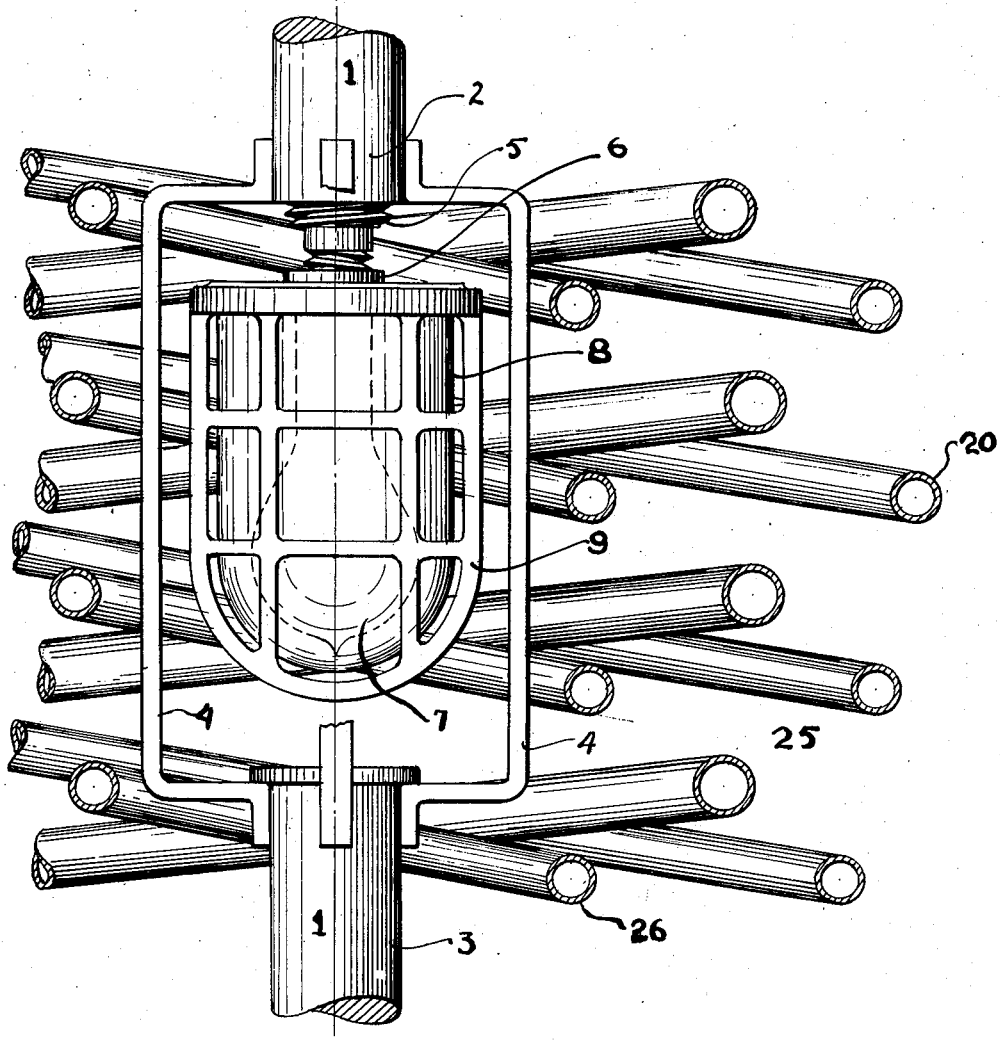
Fig. 3 is a fragmentary, enlarged, elevational view of the fish bait illustrated in Fig. 1 showing the position of an electric light and its relation to the coils.

Referring more particularly to Fig. 1, reference character 1 designates a hollow shaft which acts as a support for the device which is preferably made of a non-corrosive metal or alloy, a plastic material or the like, and which is divided into an upper and lower section. These sections are connected in some suitable manner such as by means of a plurality of bent metal guards 4 which form an open chamber for lighting equipment and which are secured to the upper section at end 2 and to the lower section at end 3.

Into end 2, a hollow reducing nipple 5 may be screwed which is adapted to coact with and hold a lamp socket 6 for an electric lamp 7. Surrounding the lamp and fastened to the socket by suitable water-tight means is a glass globe 8, which may be colored or decorated in order to enhance its attractiveness for fish. A metal protector 9 encloses globe 8 and guards the same. In this manner, the lamp equipment is given good protection against the water and external forces.

Closing the top of the shaft is a cap 10 which is preferably screwed on and which may be provided with an eye bolt 11 for a suspension cable or rope 12. This rope extends to a float 15 and then to a boat, such as a fishing skiff. In certain cases, the rope may extend directly to the fishing boat from which the artificial bait may be raised and lowered as the fish are attracted thereto.

For the purpose of electrically connecting the lamp 7 with an external electrical source, an insulated wire 14 extends from the boat on which the electrical source is located to the float and then to the cap 10 which is provided with a water-tight port 16. From the cap, the wire passes internally through the shaft 1 and the reducing nipple to the lamp socket. It is preferred to use a well insulated double cable for the purpose.

Wound around the shaft, is a twisted coil resembling a mass of worms, eels and the like. In the present instance, three coils are shown, which preferably are wound in opposite directions. An outer coil 20 is fastened at each end to the central shaft by metal annular rings 21 and 22. The ring 21 to which the upper end of coil 20 is fastened, is located preferably just below the cap 10 and is so constructed that the coil is free to revolve around the shaft. Likewise ring 22 to which the lower end of the coil 20 is secured is located just above the cap 18 at the bottom of the shaft. In like manner rings 23 and 24 are provided in order to secure intermediate coil 25 to the shaft. Within the intermediate coil, there is an inner coil 26 mounted on a set of rings 27 and 28 which permit the inner coil to revolve freely around the central shaft.

To maintain the annular rings 21, 23 and 27 in spaced relation, collars may be provided which fit over the shaft and which may be held securely in place by the caps at the ends of the shaft. In the same way, rings 22, 24 and 28 may be held in spaced relation.

By providing the foregoing construction, the coils are assured of free rotation, thus permitting the coils to rotate in opposite directions as the varied and different currents in the water strike and pass through them. As the coils revolve in opposite directions with the light of the electric lamp and/or the daylight playing on the shiny surfaces of the coils, they simulate the twisting, wriggling and turning of a live mass of worms, eels and the like. Live action and color is imparted to the present bait, thus making it attractive and alluring to the fish. When they see the bait in the upper surfaces of the water, they are immediately attracted by it and in a body the school tends to make its way toward it. To facilitate the operation of bringing the fish to the surface of the water the bait may be raised as the fish come toward it. Nets are then lowered in a large circle surrounding the artificial bait and when the fish are near enough to the surface of the water the seine is closed in the bottom thereby making it impossible for the fish to escape.

It is to be observed that the present invention provides an illuminated combination of coils simulating a live active school of eels or the like to which fish are attracted bringing them up to the surface of the water where they may be caught.

It is likewise to be noted that the present invention provides an artificial fish bait which is simple in design, easy to operate and economical to manufacture.

Although the present invention has been illustrated and described in connection with a preferred embodiment thereof, it is to be understood that variations and modifications may be resorted to without departing from the spirit and scope of the invention as described in the appended claims. Thus, the coils may be provided with screwed unions or the like to permit the dismantling and assembly of the coil and the internal structure including the light. Then again, it may be preferred to omit the use of the lower portion 3 of the shaft and fasten the lower ends of the coils to a common stem, thus mounting the lighting equipment entirely on the upper shaft. Furthermore, the coils may have a surface coating of an illuminating material, such as phosphorescent paint, etc., thereby eliminating the electric light and equipment therefor.

I claim:

1. An artificial fish bait comprising a twisted coil resembling a mass of worms and an artificial light mounted within said coil.

2. An artificial fish bait comprising a plurality of coils twisted in opposite directions, a central shaft on which the said coils are mounted, a light mounted on the said shaft within the said coils, an electrical connection with an external source, and means for supporting the bait in the water.

3. An artificial fish bait comprising a central shaft, a light mounted thereon, a plurality of rotatably-free coils mounted on the shaft surrounding the light, an electrical connection for said light, and means for raising and lowering the bait.

4. An artificial fish bait comprising a central shaft having two sections, a light mounted between the sections, and a plurality of oppositely twisted coils rotatably mounted on the said shaft.

5. An artificial fish bait comprising a shaft, a light mounted thereon, and a plurality of oppositely twisted coils mounted on the said shaft surrounding the light and resembling a mass of worms.

6. An artificial fish bait comprising a plurality of tortuous metal coils having light reflecting surfaces, said coils being twisted in opposite direction, a central shaft on which said coils are mounted, and means for supporting the bait in the water, said coils being adapted to revolve in opposite directions in the water as currents strike said coils.

JOHAN NYGAARD.